United States Patent
Zhang et al.

(10) Patent No.: US 7,164,953 B2
(45) Date of Patent: Jan. 16, 2007

(54) SPEED CONTROL DEVICE

(75) Inventors: Wennong Zhang, Fukuoka (JP); Yasuhiko Kaku, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 166 days.

(21) Appl. No.: 10/484,073

(22) PCT Filed: Jul. 18, 2002

(86) PCT No.: PCT/JP02/07334

§ 371 (c)(1),
(2), (4) Date: Jul. 6, 2004

(87) PCT Pub. No.: WO03/010880

PCT Pub. Date: Feb. 6, 2003

(65) Prior Publication Data

US 2004/0239280 A1    Dec. 2, 2004

(30) Foreign Application Priority Data

Jul. 19, 2001    (JP)    .............................. 2001-219566

(51) Int. Cl.
- G05B 12/03    (2006.01)
- G05B 11/36    (2006.01)
- B29C 45/76    (2006.01)
- G01B 45/17    (2006.01)

(52) U.S. Cl. .................. 700/41; 318/609; 264/40.1
(58) Field of Classification Search .................. 700/41, 700/151; 318/609; 264/40.1
See application file for complete search history.

(56) References Cited

U.S. PATENT DOCUMENTS

| 4,448,736 A | * | 5/1984 | Emery et al. | .............. 264/40.1 |
| 6,252,369 B1 | * | 6/2001 | Kaku et al. | .................. 318/609 |

FOREIGN PATENT DOCUMENTS

| EP | 1026818 A1 | 8/2000 |
| JP | 9-26801 A | 1/1997 |
| JP | 9-238489 A | 9/1997 |

* cited by examiner

Primary Examiner—Anthony Knight
Assistant Examiner—Sunray Chang
(74) Attorney, Agent, or Firm—Sughrue Mion, PLLC

(57) ABSTRACT

In a speed control system, there are provided a speed observer compensator (10) for inputting a difference between a speed $V_M$ of a mechanical system (5) and an estimated value $V_{MO}$ of a speed of the mechanical system (5) which is obtained by a speed observer (6) and outputting a speed difference $V_M$-$V_{MO}$ based on the input, and a mechanical system model (8) for inputting a sum of an output of the speed observer compensator (10) and an output $T_{ro}$ of a PI controller (2), and the speed observer (6) is constituted in such a manner that the signal $V_{MO}$ produced after a passage of an output of the mechanical system model (8) through a filter delay element model (11) and a dead time delay element model (12) is equal to the speed $V_M$ of the mechanical system (5), and the output of the mechanical system model (8) is set to be a speed feedback signal $V_f$ of the speed control system. Consequently, it is possible to provide a speed control device capable of removing the high frequency component of the speed feedback signal, compensating for the phase delay of the delay element so as not to generate an oscillation having a high frequency, and causing the speed of the mechanical system to follow a target speed with high precision.

1 Claim, 3 Drawing Sheets

...

SPEED CONTROL DEVICE

TECHNICAL FIELD

The present invention relates to a speed control device capable of constituting a speed observer including the delay element of a control system and setting the estimated value of a non-delayed speed of the speed observer to be a speed feedback signal, thereby removing the high frequency component of the speed feedback signal and increasing the response performance of the control system by one stage.

BACKGROUND ART

In general, a speed control system in which a filter delay element or a dead time delay element is present in a controller or a control object is shown in FIG. 3. FIG. 3 is a block diagram showing a general speed control system.

In FIG. 3, 1 denotes a subtractor, 2 denotes a PI controller, 3 denotes a filter delay element, 4 denotes a dead time delay element, 5 denotes a mechanical system including a motor, $V_r$ denotes a target speed, $V_f$ denotes a speed feedback signal, and $V_M$ denotes a speed.

In a general speed control device, both a speed signal obtained from a speed sensor (not shown) and a speed signal obtained by differentiating a position signal of a position sensor (not shown) have high frequency ripple components. Also in the control system shown in FIG. 3, therefore, the speed feedback signal $V_f$ has the high frequency ripple component, and furthermore, the phase of the filter delay element 3 or the dead time delay element 4 is delayed. For this reason, there is a problem in that the gain of the PI controller 2 is not increased and a sufficient response characteristic cannot be obtained. In order to improve such a problem of controllability, the following conventional art has been proposed.

FIG. 4 is a block diagram showing a control system according to a first conventional art. The same components in the first conventional art as those in FIG. 3 have the same reference numerals and description will be omitted, and only different components will be described. In FIG. 4, 7 denotes an adder, 8 denotes a model of a mechanical system including a motor, 9 denotes a subtractor, 10 denotes a speed observer compensator, and 14 denotes a speed observer. As shown in FIG. 4, an observer of the mechanical system is constituted and a speed estimated value of the smooth observer is set to be a speed feedback signal $V_f$. Consequently, a torque waveform is not disturbed so that the gain of the PI controller 2 can be increased (for example, JP-A-11-136983).

Moreover, FIG. 5 is a block diagram showing a control system according to a second conventional art. Components in the second conventional art are different from those in FIG. 3 in that a phase leading compensator 13 is added in series to a control system. In the phase leading compensator 13, if $T_a$ and $T_b$ are properly set to be $T_a > T_b$, the phase of the phase leading compensator 13 is led. Consequently, the gain of the PI controller 2 can be increased, and furthermore, a control performance can be enhanced.

In the first conventional art, however, the high frequency component of the speed feedback signal $V_f$ is removed and a problem of the phase delay of a control loop is not solved at all. For this reason, there is a problem in that the gain of the PI controller 2 cannot be increased sufficiently.

In the second conventional art, moreover, a gain in the high frequency area of the phase leading compensator 13 is increased. Consequently, there is a problem in that an oscillation having a high frequency is apt to be caused.

In order to solve the problems, it is an object of the invention to provide a speed control device capable of removing the high frequency component of a speed feedback signal, compensating for the phase delay of a delay element so as not to generate an oscillation having a high frequency, and causing the speed of a mechanical system to follow a target speed with high precision.

DISCLOSURE OF THE INVENTION

In order to solve the problems, the invention provides a speed control device to be a speed control system in which a filter delay element (3) or a dead time delay element (4) is present in a controller or a control object and a PI control is carried out to follow a speed command to be a target speed $V_r$, comprising a speed observer compensator (10) for inputting a difference between a speed $V_M$ of a mechanical system (5) and an estimated value $V_{MO}$ of a speed of the mechanical system (5) which is obtained by a speed observer (6) and outputting a speed difference $V_M - V_{MO}$ based on the input, and a mechanical system model (8) for inputting a sum of an output of the speed observer compensator (10) and an output $T_{ro}$ of a PI controller (2), wherein the speed observer (6) is constituted in such a manner that the signal $V_{MO}$ produced after a passage of an output of the mechanical system model (8) through a filter delay element model (11) and a dead time delay element model (12) is equal to the speed $V_M$ of the mechanical system (5), and the output of the mechanical system model (8) is set to be a speed feedback signal $V_f$ of the speed control system.

BEST MODE OF CARRYING OUT THE INVENTION

An embodiment of the invention will be described with reference to the drawings.

Figure 1:
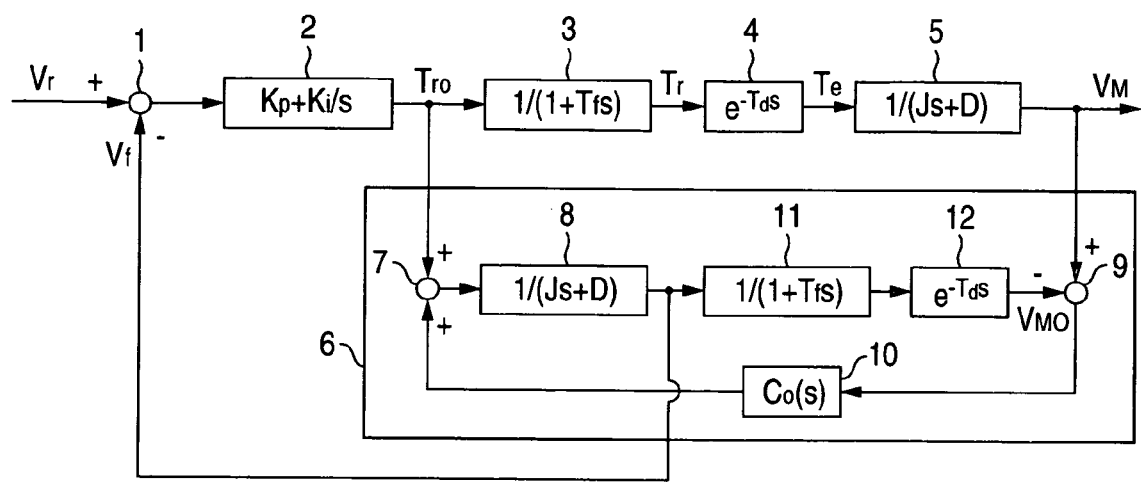
FIG. 1 is a block diagram illustrating the principle of the structure of a control system according to an embodiment of the invention.

FIG. 1 is a block diagram showing the principle of the structure of a control system according to the embodiment of the invention. The same components of the invention as those of the conventional art have the same reference numerals and description will be omitted, and only different components will be described.

In FIG. 1, 11 denotes a filter delay element model, 12 denotes a dead time delay element model, and 6 denotes a speed observer.

The invention is different from the conventional art as follows.

More specifically, in a speed control system in which a filter delay element 3 or a dead time delay element 4 is present in a controller or a control object and a PI control is carried out to follow a speed command to be a target speed $V_r$, comprising a speed observer compensator 10 for inputting a difference between a speed $V_M$ of a mechanical system 5 and an estimated value $V_{MO}$ of a speed of the mechanical system 5 which is obtained by a speed observer 6 and outputting a speed difference $V_M$-$V_{MO}$ based on the input, and a mechanical system model 8 for inputting a sum of an output of the speed observer compensator 10 and an output $T_{ro}$ of a PI controller 2, the speed observer 6 is constituted in such a manner that the signal $V_{MO}$ produced after a passage of an output of the mechanical system model 8 through a filter delay element model 11 and a dead time delay element model 12 is equal to the speed $V_M$ of the mechanical system 5, and the output of the mechanical system model 8 is set to be a speed feedback signal $V_f$ of the speed control system.

Next, an operation will be described.

In FIG. 1, the output $T_{ro}$ of the PI controller 2 and the output of the speed observer compensator 10 are added and input to the mechanical system model 8 (including a motor). The output of the mechanical system model 8 (including the motor) is set to be the speed feedback signal $V_f$ of the control system, and a signal obtained by subtracting the speed feedback signal $V_f$ from the target speed $V_r$ is input to the PI controller 2 and the output $T_{ro}$ of the PI controller 2 is input to the mechanical system (including the motor) through the filter delay element 3 and the dead time delay element 4 to control the mechanical system (including the motor), while the same output is input to a subtractor 9 through the filter delay element model 11 and the dead time delay element model 12 and is then subtracted from the speed $V_M$ of the mechanical system (including the motor), and a signal thus obtained is input to the speed observer compensator 10.

Referring to FIG. 1, in an open loop, a transfer function from the output $T_{ro}$ of the PI controller 2 to the speed feedback signal $V_f$ is expressed in the following Equation (1).

$$\frac{V_f(s)}{T_{r0}(s)} = \frac{1}{Js + D} \quad \text{Eq. (1)}$$

Figure 2:
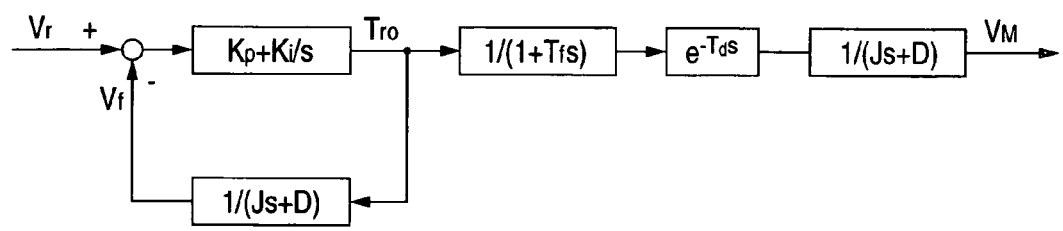
FIG. 2 is an equivalent block diagram in FIG. 1.
Figure 3:
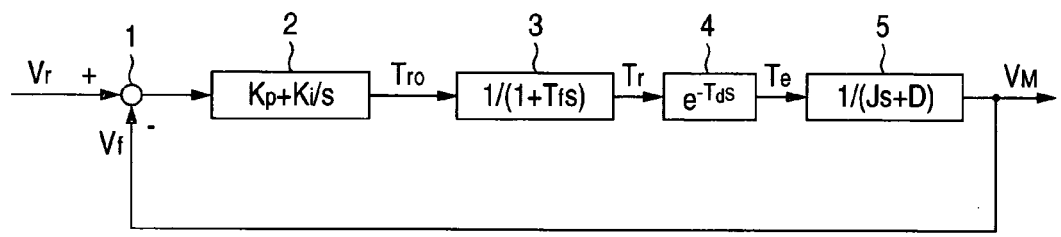
FIG. 3 is a block diagram showing an ordinary feedback control system.
Figure 4:
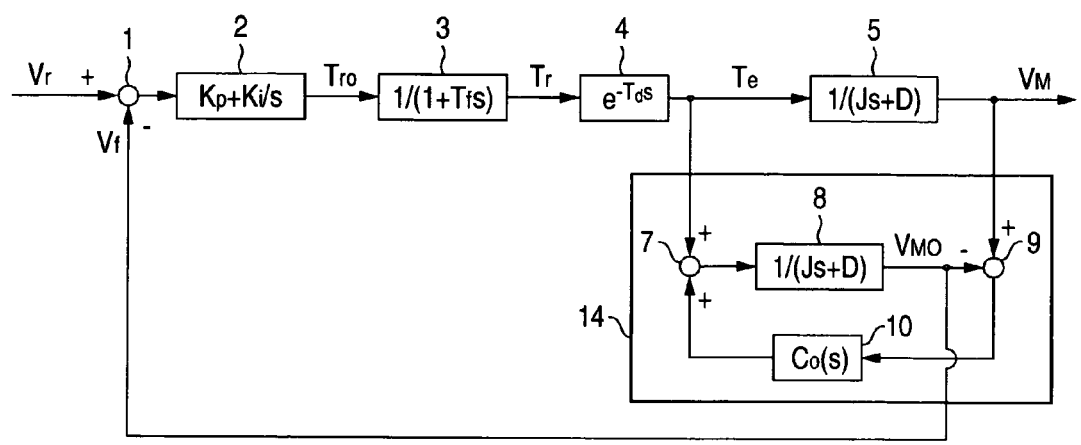
FIG. 4 is a block diagram showing a control system according to a first conventional art.
Figure 5:
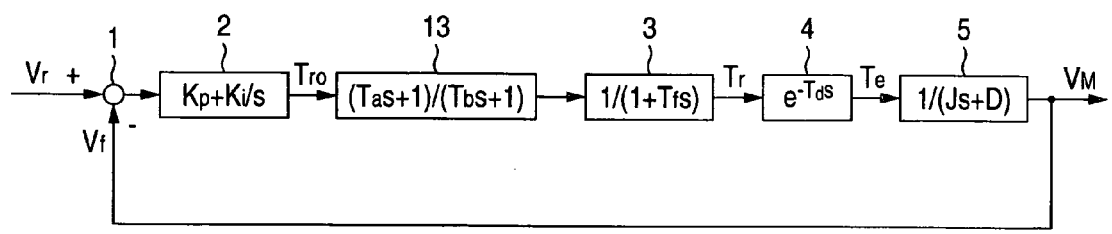
FIG. 5 is a block diagram showing a control system according to a second conventional art.

If the closed loop of the speed observer is stable, therefore, the control system in FIG. 1 can be rewritten equivalently as shown in FIG. 2. FIG. 2 is an equivalent block diagram in FIG. 1. Referring to FIG. 2, the stability of a feedback control system is the same as that of a system having no delay. Even if the gain of the PI controller is increased greatly, the control system can be prevented from being unstable. Moreover, a transfer function from the target speed $V_r$ to the speed $V_M$ of the mechanical system is expressed in the following Equation (2).

$$\frac{V_M(s)}{V_r(s)} = \frac{K_p s + K_i}{Js^2 + (D + K_p)s + K_i} \cdot \frac{1}{1 + T_f s} e^{-T_d s} \quad \text{Eq. (2)}$$

Thus, it is possible to cause the speed $V_M$ of the mechanical system to follow the target speed $V_r$ with high precision by increasing gains $K_p$ and $K_i$ of the PI controller 2. Moreover, the loop of the speed observer has a delay element and an input/output characteristic is not related to a compensator $C_o(s)$ of the speed observer based on the Equation (2). Therefore, the gain of the compensator $C_o(s)$ of the speed observer may be set to be small. Accordingly, a stable speed observer can be constituted easily.

Therefore, the invention provides the speed control system in which the filter delay element 3 or the dead time delay element 4 is present in a controller or a control object and a PI control is carried out to follow a speed command to be the target speed $V_r$, comprising the speed observer compensator 10 for inputting a difference between the speed $V_M$ of the mechanical system 5 and the estimated value $V_{MO}$ of a speed of the mechanical system 5 which is obtained by the speed observer 6 and outputting the speed difference $V_M$-$V_{MO}$ based on the input, and the mechanical system model 8 for inputting a sum of an output of the speed observer compensator 10 and the output $T_{ro}$ of the PI controller 2, wherein the speed observer 6 is constituted in such a manner that the signal $V_{MO}$ produced after a passage of an output of the mechanical system model 8 through the filter delay element model 11 and the dead time delay element model 12 is equal to the speed $V_M$ of the mechanical system 5, and the output of the mechanical system model 8 is set to be the speed feedback signal $V_f$ of the speed control system. Therefore, the speed observer including the delay element of the control system is constituted and the estimated value of a non-delayed speed of the speed observer is set to be the speed feedback signal. Consequently, the high frequency component of the speed feedback signal can be removed.

Moreover, the control system is divided into a feedback control section and a speed observer section. Consequently, the stability of the feedback loop is the same as that of a system having no delay so that the gain of the PI controller can be increased greatly. Thus, the response performance of the control system can be enhanced by one stage.

Although the loop of the speed observer has the delay element, furthermore, the compensator of the speed observer does not influence the input/output characteristic. Therefore, the gain of the compensator of the observer may be set to be small. Consequently, the stable observer can be constituted easily. More specifically, the high frequency component of the speed feedback signal is removed and the phase delay of the delay element is compensated so as not to cause an oscillation having a high frequency. Therefore, the gain of the PI controller can be increased and the speed of the mechanical system can be caused to follow the target speed with high precision.

INDUSTRIAL APPLICABILITY

As described above, the speed control device according to the invention is useful to be utilized for a speed control device of an electric motor in which a filter delay element or a dead time delay element is present in a controller or a control object.

The invention claimed is:

1. A speed control device comprising:
   a speed control system including a filter delay element or a dead time delay element in a controller or a control object, the speed control system operable to carry out a PI control to follow a speed command to be a target speed $V_r$;
   a speed observer generating a speed difference $V_M$-$V_{MO}$ which is a difference between a speed $V_M$ of a mechanical system and an estimated value $V_{MO}$ of a speed of the mechanical system;
   a speed observer compensator receiving the speed difference,
   a mechanical system model receiving sum of an output of the speed observer compensator and an output $T_{ro}$ of a PI controller;

wherein the speed observer is constituted in such a manner that the signal $V_{MO}$ produced after a passage of an output of the mechanical system model though a filter delay element model and a dead time delay element model is equal to the speed $V_M$ of the mechanical system, and wherein an output of the mechanical system model is provided as a speed feedback signal $V_f$ of the speed control system.

* * * * *